United States Patent
Drako et al.

(10) Patent No.: US 9,747,735 B1
(45) Date of Patent: Aug. 29, 2017

(54) PATTERN ANALYTICS AND PHYSICAL ACCESS CONTROL SYSTEM METHOD OF OPERATION

(71) Applicants: Dean Drako, Austin, TX (US); Steven Van Till, Bethesda, MD (US)

(72) Inventors: Dean Drako, Austin, TX (US); Steven Van Till, Bethesda, MD (US)

(73) Assignee: BRIVO SYSTEMS LLC, Bethesda, MD (US)

( * ) Notice: Subject to any disclaimer, the term of this patent is extended or adjusted under 35 U.S.C. 154(b) by 0 days.

(21) Appl. No.: 15/582,710

(22) Filed: Apr. 30, 2017

Related U.S. Application Data

(63) Continuation-in-part of application No. 14/841,711, filed on Sep. 1, 2015, now Pat. No. 9,652,913.

(60) Provisional application No. 62/171,622, filed on Jun. 5, 2015.

(51) Int. Cl.
  *G07C 9/00* (2006.01)
  *G06N 5/04* (2006.01)
  *H04W 4/02* (2009.01)
  *H04L 29/08* (2006.01)

(52) U.S. Cl.
  CPC .......... *G07C 9/00111* (2013.01); *G06N 5/04* (2013.01); *G07C 9/00031* (2013.01); *G07C 9/00039* (2013.01); *G07C 9/00103* (2013.01); *G07C 9/00571* (2013.01); *H04W 4/021* (2013.01); *H04W 4/028* (2013.01); *H04L 67/10* (2013.01)

(58) Field of Classification Search
  CPC ........... G07C 9/00103; G07C 9/00571; G07C 2009/00769; G07C 2209/63; G07C 9/00111; G07C 9/00031; G07C 9/00039; H04W 4/021; H04W 4/02; H04W 12/10; H04W 4/028; G06Q 30/0241; H04M 3/4878; G01S 5/021; G01S 5/0257; H04L 9/3247; H04L 9/3297; H04L 67/10; G06N 5/04
  USPC ................................................. 340/5.33, 5.61
  See application file for complete search history.

(56) References Cited

U.S. PATENT DOCUMENTS

| | | | |
|---|---|---|---|
| 9,077,543 B2 * | 7/2015 | Luft | H04L 9/3247 |
| 9,652,913 B2 * | 5/2017 | Drako | G07C 9/00103 |

* cited by examiner

*Primary Examiner* — Ali Neyzari
(74) *Attorney, Agent, or Firm* — Patentry; Peter G. H. Hwang

(57) ABSTRACT

A predictive physical access control and security intervention system includes a credential device, indicia sensors, portal actuators; and a data store of historic and predicted travel events, whereby out of norm behaviors trigger elevated security intervention processes. A system detects, identifies, and measures occupancy and transit patterns of identities within and through a spatial volume. A processor performs statistical calculations of dwell time, movement patterns, path vectors, frequency of entry or exit, and transmission of attribute assertions containing trusted information to subscribers. The method transforms radio signals emitted by personal communications and identity devices into metrics of human traffic patterns, behavior conducive to commercial and security interests, and provides identity attributes containing trusted information to identity service subscribers.

16 Claims, 6 Drawing Sheets

PATTERN ANALYTICS AND PHYSICAL ACCESS CONTROL SYSTEM METHOD OF OPERATION

CROSS-REFERENCES TO RELATED APPLICATIONS

The present application is a continuation in part application of serial number 14/841,711 filed Sep. 1, 2015 Geolocation estimate sensitive physical access control apparatus, system, and method which is incorporated by reference in its entirety and benefits from its disclosure priority. This non-provisional application benefits from serial number 62/171,622 filed 5 Jun. 2015 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to physical access control and identity management, access control mechanisms for managing physical "points of service", physical access portals, or other physical resource access control methods and apparatus, wireless door actuators, locks, and security systems. The field of the invention is identifying and providing analytics for human traffic patterns in indoor and spatially confined settings.

Description of the Related Art

Within this application the term physical access portal (portal) refers to a control point or boundary through which a person or vehicle or object can traverse if permitted or be denied transit whether it is an entrance or exit from or to a structure or area or region. Non-limiting examples of portals are doors, gates, lifts, elevators, bridges, tunnels, tubes, vehicles, chair, tow, canal lock, hatch, and sally ports.

As is known, mobile devices including wearable devices, communicating via the cellular telephone network, also include geo-location services by detecting signal strengths and phases from Global Positioning System (GPS) satellites, Wi-Fi Access Points, Cellular Base Stations, Bluetooth beacons, and other non mobile signal emitters which have fixed location. As is known, mobile devices may include circuits for image capture in 2D or 3D in visible and non-visible spectrum and comparison with stored images.

As is known, mobile devices including cellular phones and wearables often include NFC, RFID, and Bluetooth transceivers which can connect with security system readers.

Conventional access control systems depend on one or at most two factors of authentication. Usually a key or key card is a resonator energized by a reader. The reader is hard wired to a server which verifies access time and location of a particular door or entry. Upon presentation of the key card, an identity is transmitted to the server which operates a door lock/unlock solenoid through a wire or network. Mere possession of the key or key card enables access during certain times.

A Key Card is often lost by the user and needs to be replaced. This has a cost associated with it. The user needs to remember to bring the "key card" with them. They often forget and a temporary card needs to be issued. The key card is not always important to the user so they neglect it.

Another conventional access control system depends on knowledge of a pass code, phrase, numerical combination, or answers to questions. Knowledge of the shared secret enables access during certain times. Some systems use a combination of a NFC reader with a shared secret. Because the channels are essentially bidirectional the shared secret can be stolen.

Alternately, a cryptographic key code which is pseudo-randomly generated by a dedicated dongle has the problem of delivery to an authorized user and retention by the authorized user. It can be left behind, lost, or stolen.

Using conventional systems, there are keys for authorized persons to enter buildings or open doors, however, there are currently no accurate ways to track unregistered persons, their movements, and other patterns of behavior for either commercial or security interests. Additionally there is no current way to seek specific data such as unique visitors, return visitors, time in the physical space and associate such data to an actual identity as well as curate an experience based on that person's identity such as by presenting signage notification or control access or denial. As is known, conventional physical security systems provide access control, video surveillance, and intrusion detection.

What is needed is a way to provide for analytics of both known and unknown persons while also allowing for anonymous and pseudo-not of this measurements were privacy or other policy dictates require it. What is needed is a way to identify when visitors substantially diverge from their previous trusted behavior or routing. What is needed is additional metrics for situational awareness frictionless authentication and access control, monitoring of known and unknown persons for security threats, and creation of heat maps for optimization of various building automation systems.

BRIEF SUMMARY OF THE INVENTION

Non-trivial physical access control systems can monitor and interact with persons using active credentials to travel within and transit through a protected space such as a building or campus. Sensors at each portal collect not only credentials but also images, emissions, and attributes of persons within a range of propinquity.

Out-of-norm traffic patterns can be distinguished from the individual's conventional entrances, exits, and routes.

Interactions evoked by such out-of-norm behavior include capturing additional imagery, alerting security and safety authorities, recording sounds and other physical sensor data, and interrogation or instruction. The person could be "helped" by offering better directions, or prompted to give a purpose and destination, or requested to provide additional authentication such as a photo or audio capture at a specific location.

In some environments, absence of emissions or social network credentials is unusual.

A heightened level is security is triggered when a person significantly diverges from historical entry times and portals.

A system for physical access control to a spatial volume includes a store of past traffic patterns near and through portals by a mobile wireless authentication device. For each identity having a history of transit, a prediction of most likely paths is normalized. When transit behavior is statistically out of norm for an identity, further authentication, alerts, or security actions are triggered.

A predictive physical access control and security intervention system includes a credential device, indicia sensors, portal actuators; and a data store of historic and predicted travel events, whereby out of norm behaviors trigger elevated security intervention processes.

A system detects, identifies, and measures occupancy and transit patterns of identities within and through a spatial volume.

A processor performs statistical calculations of dwell time, movement patterns, path vectors, frequency of entry or exit, and transmission of attribute assertions containing trusted information to subscribers.

The method transforms radio signals emitted by personal communications and identity devices into metrics of human traffic patterns, behavior conducive to commercial and security interests, and provides identity attributes containing trusted information to identity service subscribers.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
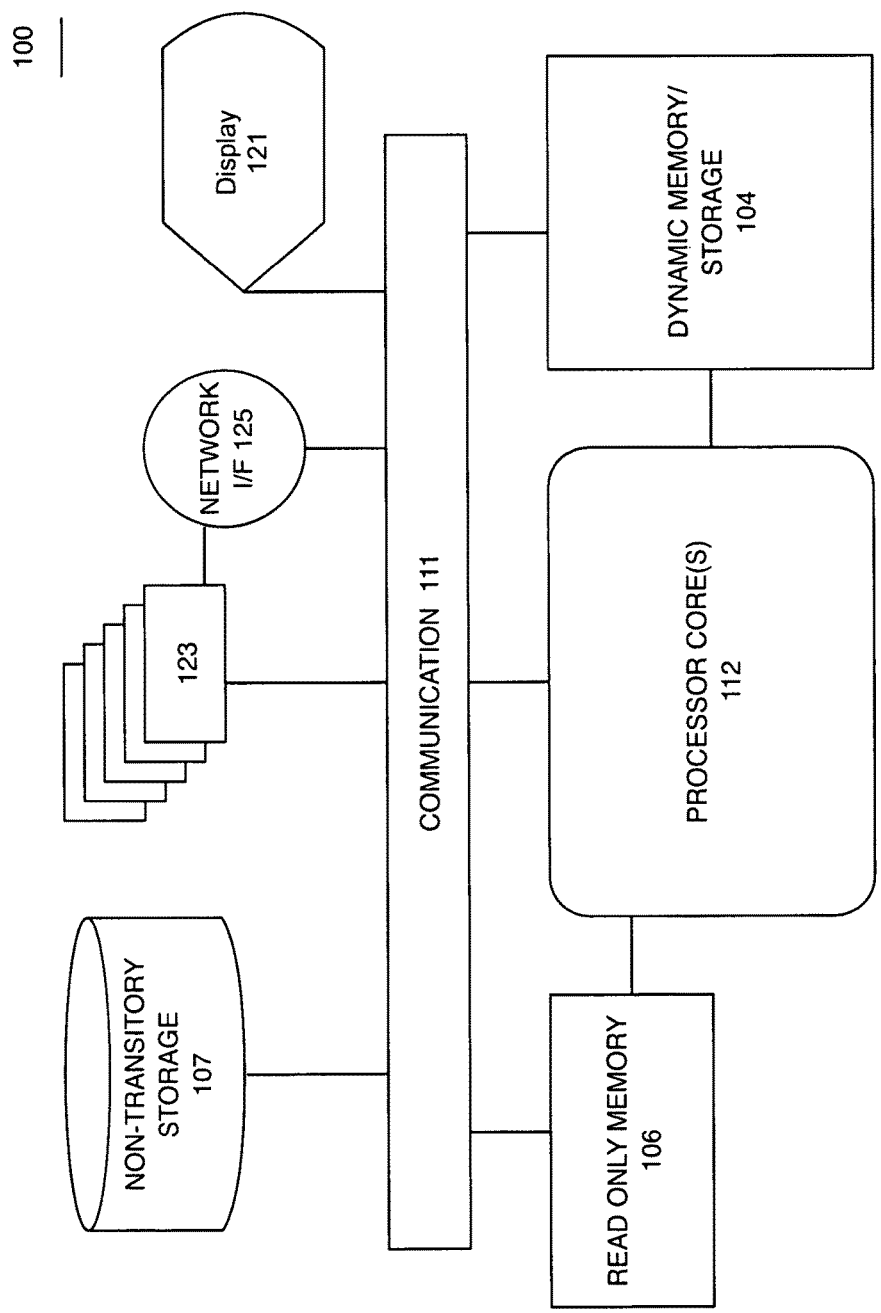
FIG. 1 and FIG. 2 are block diagrams of apparatus and systems.

A physical access control system elevates a security level when entry through or in the vicinity of portals substantially diverges from predicted patterns. Characteristics such as identity credentials or public device indicia are sensed, stored, and analyzed for association with anonymous or known persons. When such a person changes travel patterns or dwell time out-of-norm it triggers additional observation, authentication, or challenge processes that may be conducted through wireless communication or physical interaction.

Identity credentials for physical access through portals as well as characteristic emissions from personal communication devices present a variety of signatures to multi-band receivers with directional antennas which provide location information along with date-time recordation.

A service stores recorded traffic patterns and predicts a path vector when a person is within a spatial volume. If the travel of the person diverges substantially from a prediction, an elevated security process is triggered.

Examples of elevated security processes include additional image or parametric capture, facial recognition, intervention by a security agent, additional authentication steps requested via a mobile device such as text, accelerometer, audio, camera, or fingerprint.

Traffic or dwell patterns in public spaces may be classified into classes for use by commercial or security identity subscribers. Building automation systems may adjust heating, cooling, sound, and lighting according to density of population and crowd movement.

The apparatus and methods disclosed by this application transform radio-frequency electro-magnetic encoded data into triggers and attributes to control portals, communication devices, sensors, motors, and notification devices.

Referring now to the drawings which depict only typical embodiments of the invention and are therefore not to be considered limiting of its scope.

FIG. 1 is a block diagram of a processor 100 suitable for performance of computer executable process steps for transforming location and identity data into predicted travel paths, determining substantial variance from predicted behavior by persons, prosecuting elevated security operations through communication devices and other user interfaces, and transmitting identity attributes to service subscribers.

FIG. 1 is a block diagram of an exemplary processor that may be used to perform one or more of the functions described herein. Referring to FIG. 1, processor 100 may comprise an exemplary client or server process. Processor 100 comprises a communication mechanism or bus 111 for communicating information, and a processor core 112 coupled with bus 111 for processing information. Processor core 112 comprises at least one processor core, but is not limited to a processor core, such as for example, ARM™, Pentium™, etc.

Processor 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor core 112.

Processor 100 also comprises a read only memory (ROM) and/or other static storage device 106 coupled to bus 111 for storing static information and instructions for processor core 112, and a non-transitory data storage device 107, such as a magnetic storage device or flash memory and its associated control circuits. Data storage device 107 is coupled to bus 111 for storing information and instructions.

Processor 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a network interface (wired or wireless) 125 for communicating selections and command and data input to processor core 112.

Figure 2:
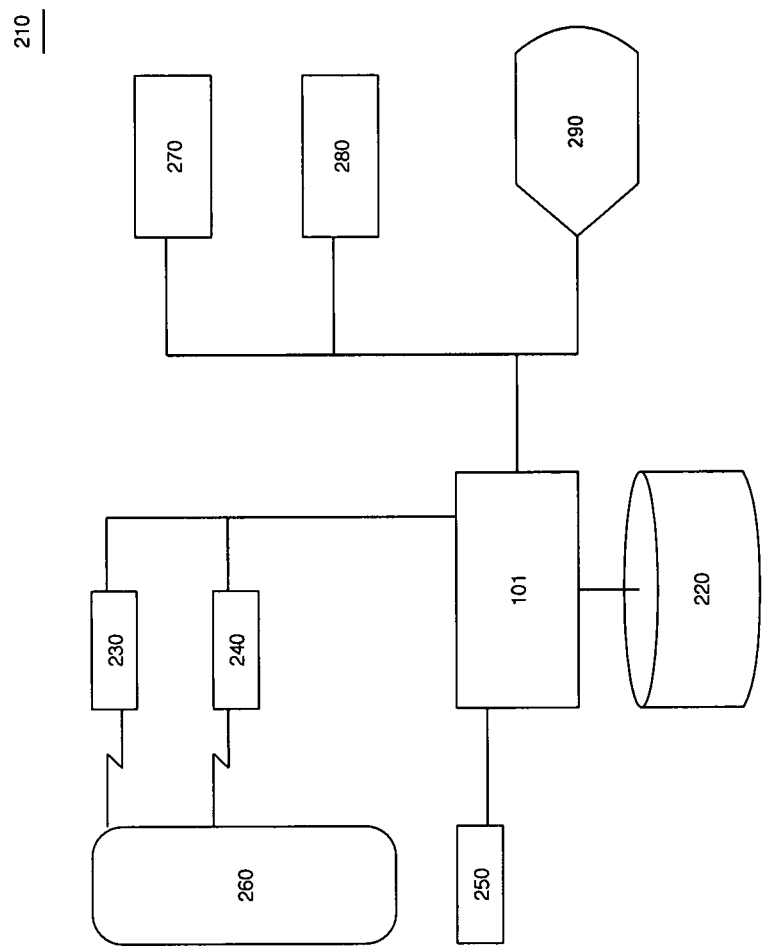

FIG. 2 shows a block diagram of a system 210 which uses the processor of FIG. 1 (101), coupled to a non-transitory data and instruction store 220, and by a network to a plurality of sensors 230-240 and physical access control portal actuators 250. The system further comprises at least one mobile credential device 260 which when in the vicinity of sensors or portals provide identity indicia. The system is further coupled in an embodiment to signaling apparatus 270, to identity service subscribers 280, and to a security operator console 290.

Figure 3:
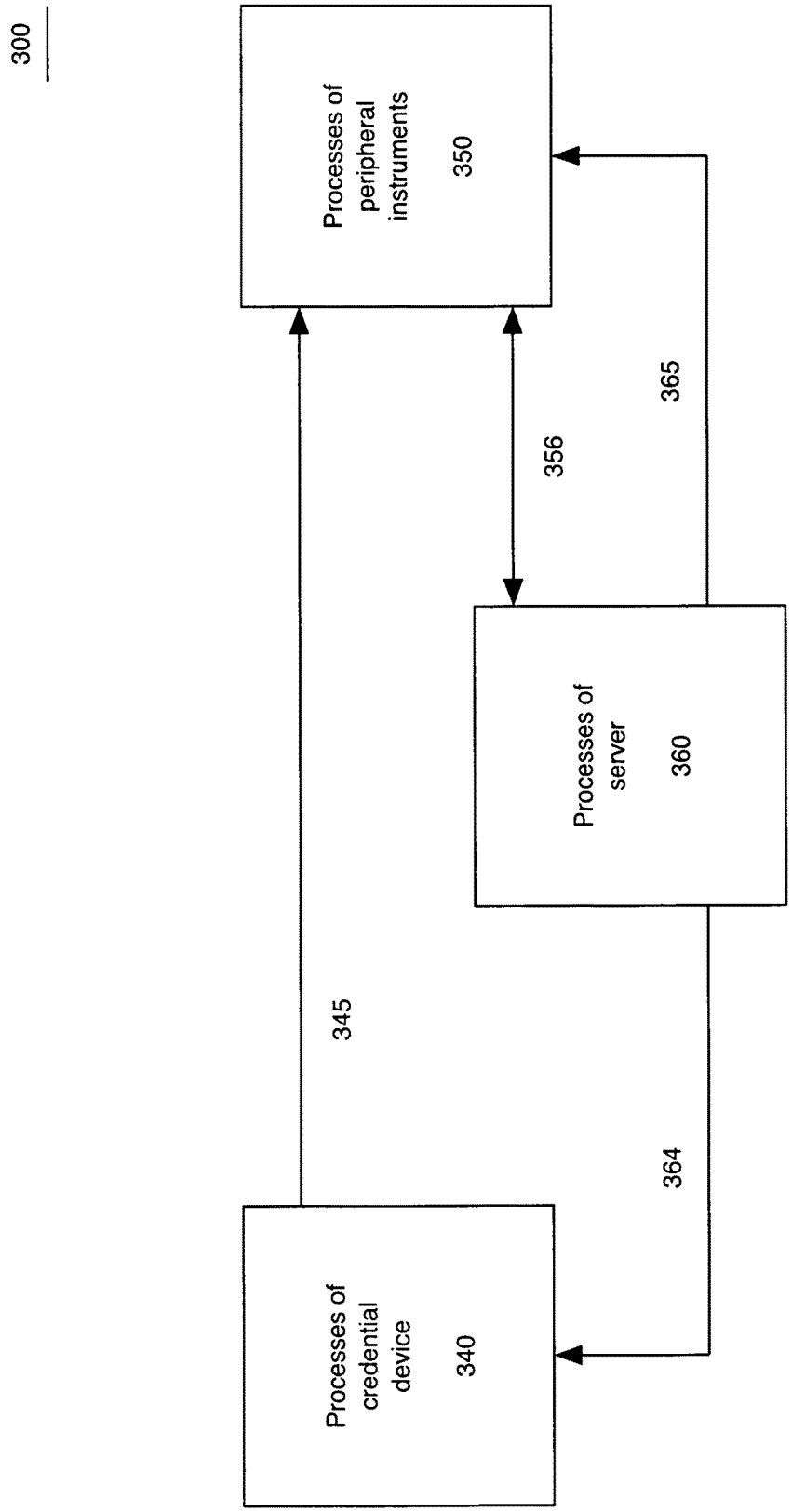
FIG. 3 is a dataflow diagram between processes.

FIG. 3 is a flowchart of a computer implemented method 300 for operation of various components of the system which process in parallel as well as triggered by other components. There are a group of processes 340 that independently perform method steps within a mobile credential device. One process results in a communication process transmitting identity data 345 to processes of the peripheral instruments 350. Processes of the peripheral instruments 350 and of the server 360 determine enablement or disablement of portal actuators when identity of the credential device are substantially matching predicted traffic patterns 356. Elevated security processes result when the location and date time of the credential device substantially diverge from predicted patterns. One elevated security process results in triggering 364 additional processes in the credential device to capture audio, image, passphrases, fingerprints, movements, or iris scans. Other elevated security process include triggering 365 peripheral instruments to alert a security console operator, disable lighting or portal actuators, capture images, sounds, vibrations, or other indicia, or transmit identity attributes to service subscribers.

Figure 4:
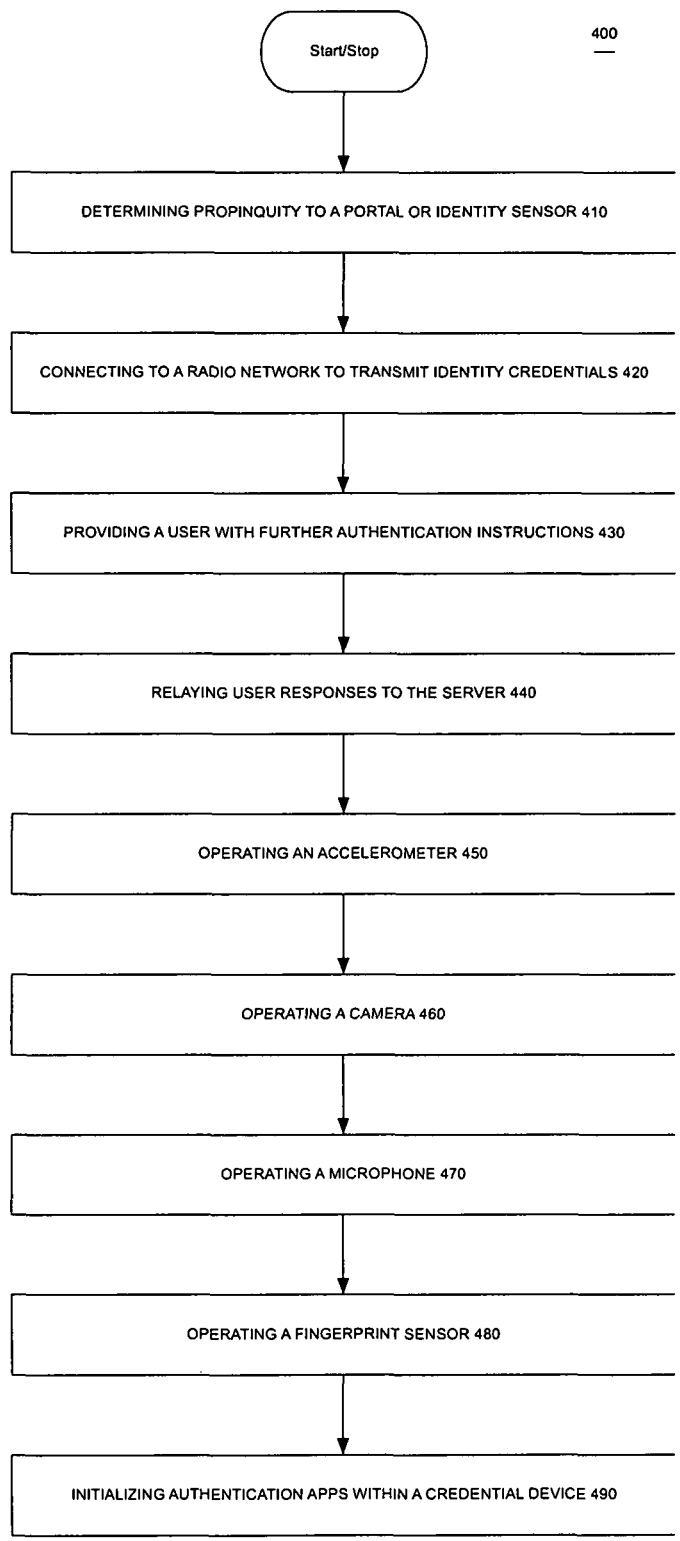
FIG. 4-6 are flowcharts of methods performed by a processor.

FIG. 4 is a flowchart of processes 400 controlling operation of a credential device. Method steps include determining propinquity to a portal or identity sensor 410; connecting to a radio network to transmit identity credentials 420; providing a user with further authentication instructions 430; relaying user responses to the server 440; operating an accelerometer 450; operating a camera 460; operating a microphone; 470; operating a fingerprint sensor 480; and initializing authentication apps within a credential device 490. In embodiments, identity credentials include a digital code, a visual representation of a digital code, and a digital code embedded in a physical device.

Figure 5:
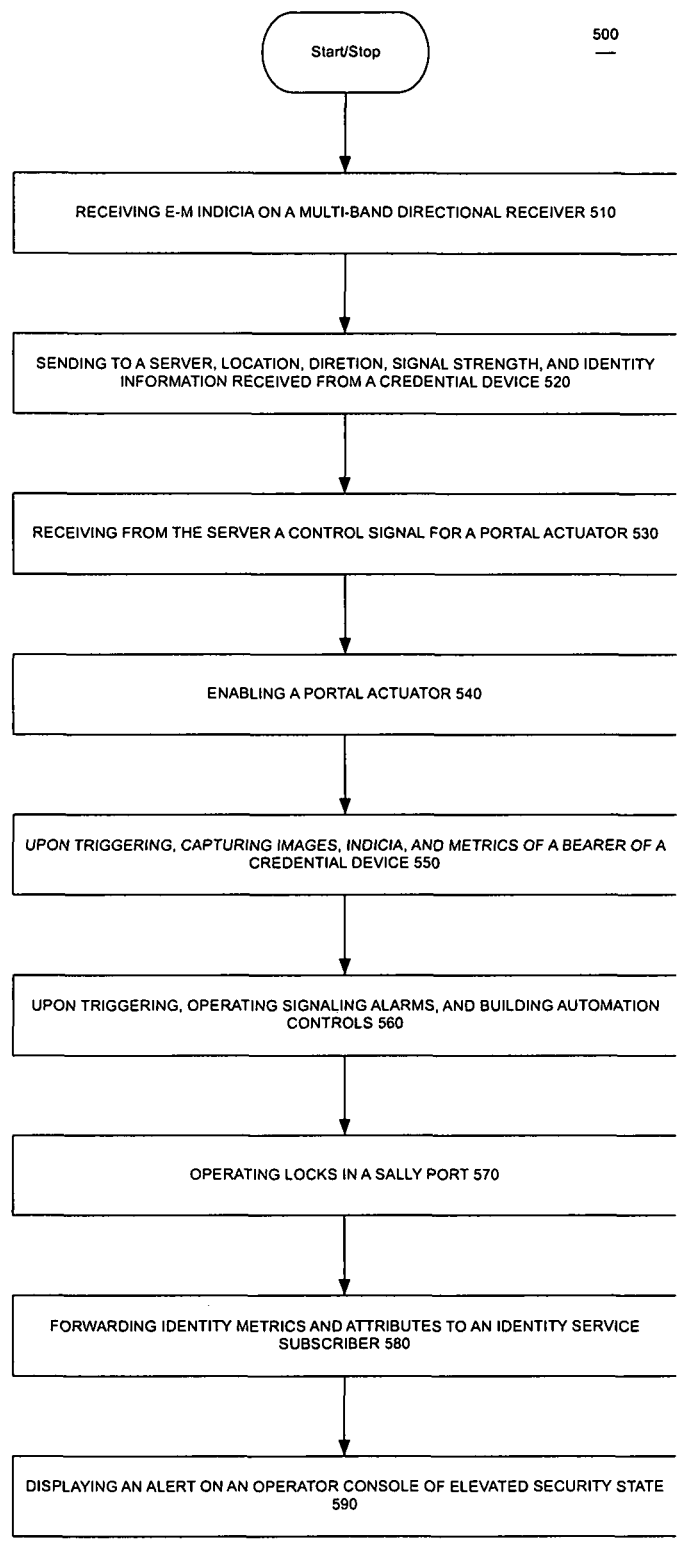

FIG. 5 is a flowchart of processes 500 controlling at least one of a plurality of peripheral instruments. Method steps include receiving electromagnetic indicia on a multi-band directional receiver 510; sending to a server location, direction, signal strength, and identity information received from a credential device 520; receiving from the server a control signal for a portal actuator 530; enabling a portal actuator 540; upon triggering, capturing images, indicia, and metrics of a bearer of a credential device 550; upon triggering, operating signaling alarms, and building automation controls 560; operating locks in a sally port 570; forwarding identity metrics and attributes to a identity service subscriber 580; and displaying an alert on an operator console of elevated security 590. Peripheral devices include readers such as keypads, in which case a token is translated and expresses as a series of letters and or digits and transmitted to a credential carrier; bar code scanners, in which case a credential carrier displays a visual bar code transmitted from the credentialing service and communicates it to the reader using visual scanning of the bar code; Bluetooth device, in which case the credential carrier interacts with the reader using Bluetooth communications; and NFC readers, in which case the credential carrier interacts with the reader using radio waves and protocols defined in the NFC standard.

Figure 6:
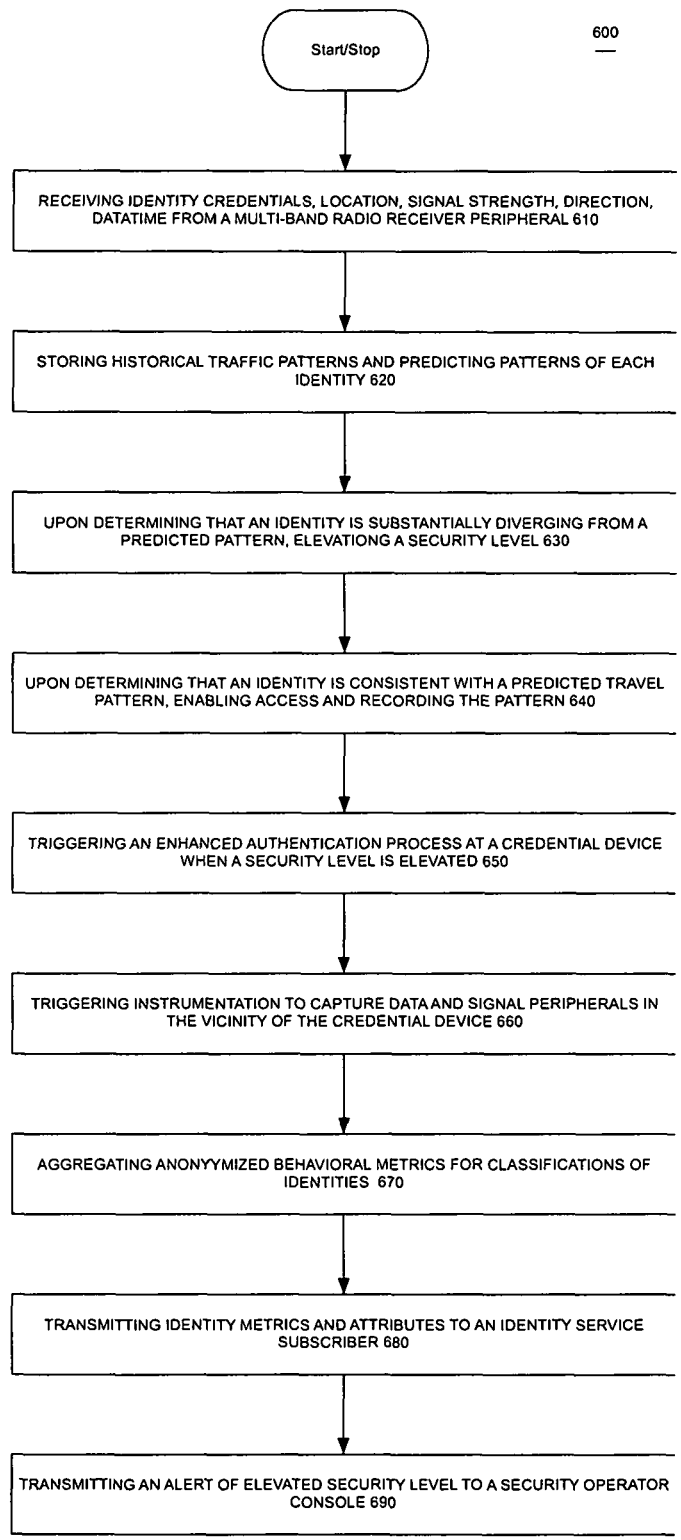

FIG. 6 is a flowchart of processes controlling a server 600. Method steps include receiving identity credentials, location, signal strength, direction and datetime from a multi-band radio receiver peripheral 610; storing historical traffic patterns and predicting patterns for each identity 620; upon determining that an identity is substantially diverging from a predicted pattern, elevating a security level 630; upon determining that an identity is consistent with a predicted travel pattern, enabling access and recording the pattern 640; triggering an enhanced authentication process at a credential device when a security level is elevated 650; triggering instrumentation to capture data and signal peripherals in the vicinity of the credential device 660; aggregating anonymized behavioral metrics for classifications of identities 670; transmitting identity metrics and attributes to a identity service subscriber 680; and transmitting an alert of elevated security level to a security operator console 690. Other processes include multi-band signal processing, device acquisition, identification of "knowns", identification and classification of "unknowns", ranging and positioning, analytics, authentication, and image and facial recognition.

One aspect of the invention is a system including a traffic pattern store for each identity; a plurality of physical access control sensors and actuators; at least one mobile wireless active authentication device; an anthropometrics (measurements of human body, expressions, and movement) server coupled to a wireless network and to the stores, sensors, actuators, and devices above; and a computer implemented physical access control program to enable or disable portals when it determines out of norm traffic patterns and challenges the bearer of an authentication device to perform tasks or disclose authentication knowledge.

Another aspect of the invention is a method for operation of a physical access control system including the steps: storing entrance events, exit events, and identification events for each identity associated with a mobile wireless active authentication device; predicting for each identity, a normal traffic pattern according to time of day and day of week suitable for their role within the enterprise; capturing identity information at sensors associated with each physical access control portal; determining an out of norm condition when a traffic pattern of an identity is outside the normal variance of predicted traffic patterns; and controlling a server to emit a warning, a challenge, a denial of access, or alerting a security agent.

Another aspect of the invention is a system for physical access control to a spatial volume includes a store of past traffic patterns near and through portals by a mobile wireless authentication device. For each identity having a history of transit, a prediction of most likely paths is normalized. When transit behavior is statistically out of norm for an identity, further authentication, alerts, or security actions are triggered.

One aspect of the invention is a system for predictive physical access control and elevation of security intervention including, at least one mobile identity credential device (credevice); coupled by wireless electro-magnetic communication to, a plurality of indicia sensors; digitally coupled through a network to, a predictive physical access control server apparatus; coupled to a plurality of portal actuators; and a data store of historic and predicted travel events including portal transits and presentation of indicia to sensors, whereby out of norm behaviors determined by the server apparatus trigger elevated security intervention processes.

In an embodiment, the system also includes a security system operator console and an elevated security intervention process includes an alert to the console of an out of norm behavior.

In an embodiment, the system also includes an embedded app configured on the credevice and out of norm behavior triggers the embedded app to elicit enhanced authentication by the bearer.

In an embodiment, the system also includes imaging and sally port circuits triggered by said out of norm behavior.

Another aspect of the invention is a predictive physical access control server apparatus (PPAC server apparatus) communicatively coupled to indicia sensors, portal actuators, and mobile identity credential devices, which includes, a processor; coupled to computer-readable non-transitory media, a data store of historical and predicted traffic patterns for each identity; a network interface to devices, sensors and portal actuators; and, an instruction store of executable commands to determine a predicted traffic pattern, to determine when an identity is substantially diverging from said pattern, and to trigger a security elevation process at portals and credential devices as a consequence.

In an embodiment the server also includes network interface transforms a security elevation process into a command to capture additional images, sounds, and measurements at sensors surrounding an identity which diverges from said pattern.

In an embodiment said network interface transforms a security elevation process into a command to credential device to request a movement, an image, an audio input, a touch, or additional passphrase or interaction with a security console operator.

In an embodiment said instruction store requests a command sequence from an operator console to release an elevated security condition.

Another aspect of the invention is a server-instruction implemented method for initiating elevation of security intervention causing portal actuator energizing and mobile device interrogating events, the method, stored in non-transitory computer readable media, comprising performance of the following, receiving identity credentials from a device within range of its controlled portals; comparing current role, time of day, day of week, and responsibility with past traffic patterns of the device; storing traffic patterns and predicting traffic patterns; determining that a entries and exits within a recent period are substantially dissimilar to recently predicted traffic patterns; and notifying an operator console that an out of norm transit pattern is in process.

In an embodiment, the method also includes triggering an application at a credential device to interrogate for further keyboard authentication.

In an embodiment, the method also includes triggering an application at a credential device to activate accelerometer, camera, and microphone for frequency-based authentication.

In an embodiment, the method also includes initiating transmission of a live stream of images at a portal to an operator console.

In an embodiment, the method also includes upon determining an out of norm transit pattern is in process, causing a sally port to entrap a badly behaving transitee.

Another aspect of the invention is a system for detecting, identifying, and measuring occupancy and transit patterns of identities within and through a spatial volume, including, at least one mobile indicia emitting communications device associated with a person; a plurality of electro-magnetic signal sensors, demodulators, and directional antennas; coupled through network interfaces to; a cloud computing service center; a computer-readable store of received signal strengths and unique identifiers associated with a communications device; and a processor coupled to non-transitory instruction store to cause performance of statistical calculations of dwell time, movement patterns, path vectors, frequency of entry or exit, and transmission of attribute assertions containing trusted information to subscribers.

Another aspect of the invention is a cloud computing service center for transforming radio signals received by electro-magnetic sensors into identity metrics and traffic statistics for identity service subscribers, including, a processor; adapted by executable instructions read from, a non-transitory computer readable media; on which is tangibly encoded data and programs, to upon reception of digital indicia, determine location and identities from physical access control actuators and social media attributes; determine analytics for human traffic patterns, dwell, movements, preferred vicinity by demographic classification, and affinity; optimize messaging and facility utilization; and, transmit, via network connections, to service subscribers, identity information and attributes on anonymized aggregations of visitors.

Another aspect of the invention is a method for transforming radio signals emitted by personal communications and identity devices into metrics of human traffic patterns, behavior conducive to commercial and security interests, and identity attributes containing trusted information, the method including, passively acquiring radio signals across radio bands, protocols, and channels, compiling lists of all unique identifiers for all signals; cross referencing physical access control identifiers and social media service user tokens; creating federated identity information from a plurality of radio emissions of personal communications and identity devices; determining position by triangulation and trilateration of signal strengths received at a plurality of directional antennas; classifying persons into known, unknown, and anonymous cohorts; determining metrics of population density, flow, dwell time, paths, new, repeat, and unique visitation patterns; and, transmitting to service clients, an attribute assertion containing trusted information about an identity.

Another aspect of the invention is a system for physical access control to a spatial volume includes a store of past traffic patterns near and through portals by a mobile wireless authentication device. For each identity having a history of transit, a prediction of most likely paths is normalized. When transit behavior is statistically out of norm for an identity, further authentication, alerts, or security actions are triggered.

One aspect of the invention is a system for physical access control of a structure or an area which system includes at least one mobile wireless device which combines a cellular communication transceiver and at least one receiver enabled to receive and measure GPS, Bluetooth, or WiFi radio signals, their signal strength, and the phase of clock signals and pseudo-random codes; a physical access portal located at a known global positioning system coordinate; a physical access control server coupled to a wireless network and further coupled to an actuator operable to secure or release the physical access portal; and a store of user identities and time windows when an authenticated user may traverse the physical access portal within a range set by an administrator of a global positioning system coordinate.

CONCLUSION

Advantageously the invention provides a type of gateway proxy between online identity providers such as social network services on the one hand and physical resources that typically use localized access control methods that neither find access management to any public identity nor provide longitudinal integrity or continuity of identity across discrete occurrences of an individual gaining access to the resource. In addition the invention provides additional service above and beyond gateway and proxy functions that enhance both the social media services and physical access control systems between which they operate. In this context an identity provider is a system that creates maintains and manages identity information for principals, users, services, or systems.

Advantageously, the system provides principal authentication to service subscribers within a federation or distributed network as a trusted third-party that can be relied upon by users and applications. When users and applications are establishing a dialogue that must be authenticated the service sends an attribute assertion containing trusted information about the user to the Service subscriber.

The techniques described herein can be implemented in digital electronic circuitry, or in computer hardware, firmware, software, or in combinations of them. The techniques can be implemented as a computer program product, i.e., a computer program tangibly embodied in a non-transitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; internal hard disks or removable disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A system for predictive physical access control and elevation of security intervention comprising:
   at least one mobile identity credential device (credevice); coupled by wireless electro-magnetic communication to,
   a plurality of indicia sensors; digitally coupled through a network to,
   a predictive physical access control server apparatus; coupled to
   a plurality of portal actuators; and
   a data store of historic and predicted travel events including portal transits and presentation of indicia to sensors, whereby out-of-norm behaviors determined by the server apparatus trigger elevated security intervention processes.

2. The system of claim 1 further comprising a security system operator console and an elevated security intervention process includes an alert to the console of an out of norm behavior.

3. The system of claim 1 further comprising an embedded app configured on the credevice and out-of-norm behavior triggers the embedded app to elicit enhanced authentication by the bearer.

4. The system of claim 1 further comprising imaging and sally port circuits triggered by said out-of-norm behavior.

5. A predictive physical access control server apparatus (PPAC server apparatus) communicatively coupled to indicia sensors, portal actuators, and mobile identity credential devices, the PPAC server apparatus comprising:
   a processor; coupled to computer-readable non-transitory media,
   a data store of historical and predicted traffic patterns for each identity;
   a network interface to devices, sensors and portal actuators; and,
   an instruction store of executable commands to determine a predicted traffic pattern, to determine when an identity is substantially diverging from said pattern, and to trigger a security elevation process at portals and credential devices as a consequence.

6. The PPAC server apparatus of claim 5 wherein said network interface transforms a security elevation process into a command to capture additional images, sounds, and measurements at sensors surrounding an identity which diverges from said pattern.

7. The PPAC server apparatus of claim 5 wherein said network interface transforms a security elevation process into a command to credential device to request a movement, an image, an audio input, a touch, or additional passphrase or interaction with a security console operator.

8. The PPAC server apparatus of claim 5 wherein said instruction store requests a command sequence from an operator console to release an elevated security condition.

9. A server-instruction implemented method for initiating elevation of security intervention causing portal actuator energizing and mobile device interrogating events, the method, stored in non-transitory computer readable media, comprising performance of the following processes:
   receiving identity credentials from a device within range of its controlled portals;
   comparing current role, time of day, day of week, and responsibility with past traffic patterns of the device;
   storing traffic patterns and predicting traffic patterns;

determining that entries and exits within a recent period are substantially dissimilar to recently predicted traffic patterns; and notifying an operator console that an out of norm transit pattern is in process.

10. The method of claim 9 further comprising:

triggering an application at a credential device to interrogate for further keyboard authentication.

11. The method of claim 9 further comprising:

triggering an application at a credential device to activate accelerometer, camera, and microphone for frequency based authentication.

12. The method of claim 9 further comprising:

initiating transmission of a live stream of images at a portal to an operator console.

13. The method of claim 9 further comprising:

upon determining an out-of-norm transit pattern is in process, causing a sally port to entrap a badly behaving transitee.

14. A system for detecting, identifying, and measuring occupancy and transit patterns of identities within and through a spatial volume, the system comprising:

at least one mobile indicia emitting communications device associated with a person;

a plurality of electro-magnetic signal sensors, demodulators, and directional antennas; coupled through network interfaces to;

a cloud computing service center;

a computer-readable store of received signal strengths and unique identifiers associated with a communications device; and a processor coupled to non-transitory instruction store to cause performance of statistical calculations of dwell time, movement patterns, path vectors, frequency of entry or exit, and transmission of attribute assertions containing trusted information to subscribers.

15. A processor apparatus of a cloud computing service center for transforming radio signals received by electromagnetic sensors into identity metrics and traffic statistics for identity service subscribers, the apparatus comprising:

a processor; adapted by executable instructions read from, a non-transitory computer readable media; on which is tangibly encoded data and programs, to upon reception of digital indicia, determine location and identities from physical access control actuators and social network identity attributes;

determine analytics for human traffic patterns, dwell, movements, preferred vicinity by demographic classification, and affinity;

optimize messaging and facility utilization; and, transmit, via network connections, to service subscribers, identity information and attributes on anonymized aggregations of visitors.

16. A method for transforming radio signals emitted by personal communications and identity devices into metrics of human traffic patterns, behavior conducive to commercial and security interests, and identity attributes containing trusted information, the method comprising:

passively acquiring radio signals across radio bands, protocols, and channels, compiling lists of all unique identifiers for all signals;

cross referencing physical access control identifiers and social network service user tokens;

creating federated identity information from a plurality of radio emissions of personal communications and identity devices;

determining position by triangulation and trilateration of signal strengths received at a plurality of directional antennas;

classifying persons into known, unknown, and anonymous cohorts;

determining metrics of population density, flow, dwell time, paths, new, repeat, and unique visitation patterns; and, transmitting to service clients, an attribute assertion containing trusted information about an identity.

* * * * *